United States Patent [19]
Yamamoto et al.

[11] Patent Number: 5,158,323
[45] Date of Patent: Oct. 27, 1992

[54] AIRBAG RESTRAINT SYSTEM FOR MOTOR VEHICLE

[75] Inventors: Isao Yamamoto, Zama; Katsumi Hosoya, Tokyo, both of Japan

[73] Assignee: Nissan Motor Co., Ltd., Yokohama, Japan

[21] Appl. No.: 754,469

[22] Filed: Sep. 4, 1991

[30] Foreign Application Priority Data

Sep. 5, 1990 [JP] Japan ................................ 2-93287

[51] Int. Cl.⁵ ............................................ B60R 21/32
[52] U.S. Cl. ...................................... 280/734; 280/735; 307/10.1; 340/438
[58] Field of Search ................ 280/728, 734, 735; 340/438; 307/10.1

[56] References Cited

U.S. PATENT DOCUMENTS

| | | | |
|---|---|---|---|
| 4,346,913 | 8/1982 | Schrauf et al. | 280/735 |
| 4,384,734 | 5/1983 | Yasui | 280/735 |
| 4,893,109 | 1/1990 | Vrabel et al. | 340/438 |
| 4,933,570 | 6/1990 | Swart et al. | 307/10.1 |
| 5,058,920 | 10/1991 | Burger et al. | 280/735 |
| 5,068,640 | 11/1991 | Burger et al. | 280/735 |

Primary Examiner—Kenneth R. Rice
Attorney, Agent, or Firm—Foley & Lardner

[57] ABSTRACT

An airbag restraint system for an automotive vehicle has a first airbag disposed in its folded state in a steering wheel padding and a second airbag disposed in its folded state in a glove box. The first airbag is adapted to be fully inflated upon ignition of a first inflator. The second airbag is adapted to be inflated to some extent upon ignition of a second inflator, and fully inflated upon ignition of a third inflator. The first and second inflators are simultaneously ignited respectively under activations of first and second squibs. Immediately after starting of the ignition of the first and second inflators, an electronic power supply to the first and second squibs is stopped respectively upon breakage of first and second breakable conductor members through which an electric power is suppliable to the first and second squibs. The breakable conductor members are adapted to be broken respectively when the first and second airbags inflate. The third squib is late activated to ignite the third inflator after stopping of the electric power supply to the first and second squibs.

7 Claims, 5 Drawing Sheets

AIRBAG RESTRAINT SYSTEM FOR MOTOR VEHICLE

BACKGROUND OF THE INVENTION

1. Field of the Invention

This invention relates to improvements in an airbag restraint system including a plurality of airbags which are different in an inflating manner, and more particularly to a triggering unit for initiating inflation of the airbags.

2. Description of the Prior Art

A variety of airbag restraint systems have been proposed and put into practical use for an automotive vechile. Of these, it is also known that a plurality of airbags are mounted in an automotive vehicle, in which one is disposed in a steering wheel padding for the purpose of protecting a driver seated on a driver's seat while another is disposed, for examle, in a glove box for the purpose of protecting a passenger seated on a front seat beside the dirver's seat.

Such an airbag restraint system includes a triggering unit as shown in FIG. 7. Referring to FIG. 7, the triggering unit includes a first squib 1 for igniting a first inflator (high pressure gas generator) to inflate a first airbag for the driver. Second and third squibs 2 and 3 are provided for igniting respective second and third inflators (high pressure gas generators) to inflate a second airbag for the passenger on the front seat beside the driver's seat. A capacitor 4 is provided to be charged upon raising the voltage of an electric source such as a battery 6 under the action of an auxiliary electric source circuit 5, and serves as an electric source for the squibs 1, 2, 3 when the battery is disabled upon a vehicle collision. An acceleration (or deceleration) switch 7 is electrically connected between the capacitor 4 and the squibs 1, 2, 3 and adapted to be turned ON when an acceleration (or deceleration) sensor (not shown) detects a deceleration exceeding a predetermined level.

When the acceleration switch 7 is turned ON, the charged voltage of the capacitor 4 is supplied to the first squib 1 and to the second squib 2, thereby inflating the first and second airbags. It will be understood that at this stage, the second airbag cannot be completely inflated because all the inflators have not yet ignited. Simultaneously with the turning-ON of the acceleration switch 7, a timer 8 starts clocking and causes a transistor 9 to be turned ON after lapse of a predetermined time, so that the charged voltage of the capacitor 4 is supplied to the third squib 3 thereby igniting the third inflator for the second airbag for the passenger on the front seat beside the driver's seat.

However, drawbacks have been encountered in the above discussed conventional airbag restraint system, particularly in its triggering unit. That is to say, if any one of the first and second squibs 1, 2 activated or operated prior to the third squib 3 is lowered in its resistance value below a predetermined level, an electric power consumption of the electric power source increases.

SUMMARY OF THE INVENTION

It is an object of the present invention to provide an improved airbag restraint system for a motor vehicle, in which a plurality of airbags can be inflated in predetermined timings without using a large capacity electric source.

Another object of the present invention is to provide an improved airbag restraint system for a motor vehicle, which can prevent unnecessary consumption of electric power during inflation of the airbags.

A further object of the present invention is to provide an improved airbag restraint system for a motor vehicle in which an electric power supply for previously activated squibs are interrupted after the starting of inflation of the airbags.

The airbag restraint system of the present invention is for a motor vehicle and has a principle as schematically illustrated in FIG. 1. The airbag restraint system is comprised of first and second airbags 100, 101. A first inflating means 102 is provided to inflate the first airbag, when driven. A second inflating means 103 is provided to inflate the second airbag, when driven. A third inflating means 104 is provided to inflate the second airbag, when driven. A first driving means 105 is provided to drive the first inflating means, when operated. A second driving means 106 is provided to drive the second inflating means, when operated. The first and second driving means 105, 106 are operated when a deceleration exceeding a predetermined level is applied to the vehicle. A third driving means 107 is provided to drive the third inflating means, when operated. A retardation means 108 is provided to operate the third driving means upon lapse of a predetermined time after a time at which the first and second driving means are operated. Additionally, an interrupting means 109 is provided to interrupt supply of electric current to the first and second driving means after the first and second inflating means starts to be driven.

Accordingly, when the deceleration exceeding the predetermined level is applied to the vehicle, the first and second inflating means 102, 103 are driven to the first and second airbags 100, 101 under the operation of the first and second driving means 105, 106. Immediately after the inflation of the first and second airbags 100, 101, an electric power supply to the first and the second driving means is interrupted thereby stopping the driving action of the first and second driving means to the first and second inflating means. Thereafter, the third driving means 107 is operated to drive the third inflating means 104 thus additionally inflating the second airbag 101.

Thus, since the electric power supply to the precedently driven inflating means is stopped upon starting of the inflating means, the precedently driven inflating means is prevented from unnecessary electric power consumption even if lowering in its resistance value occurs. Accordingly, the electric power supply is carried out only to the late driven inflating means, thus achieving driving of the late driven inflating means without enlarging the capacity of the electric source.

BRIEF DESCRIPTION OF THE DRAWINGS

In the drawings, like reference numerals designate like elements and parts throughout all figures, in which.

DETAILED DESCRIPTION OF THE INVENTION

Figure 1:
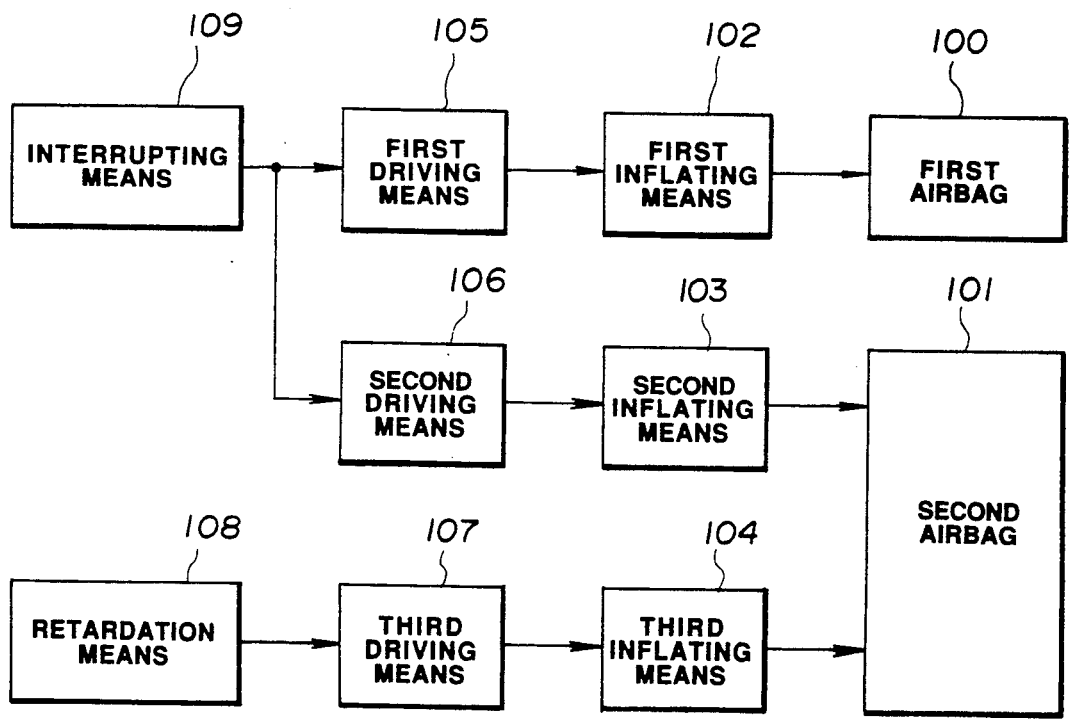
FIG. 1 is a block diagram showing the principle of an airbag restraint system according to the present invention.
Figure 2:
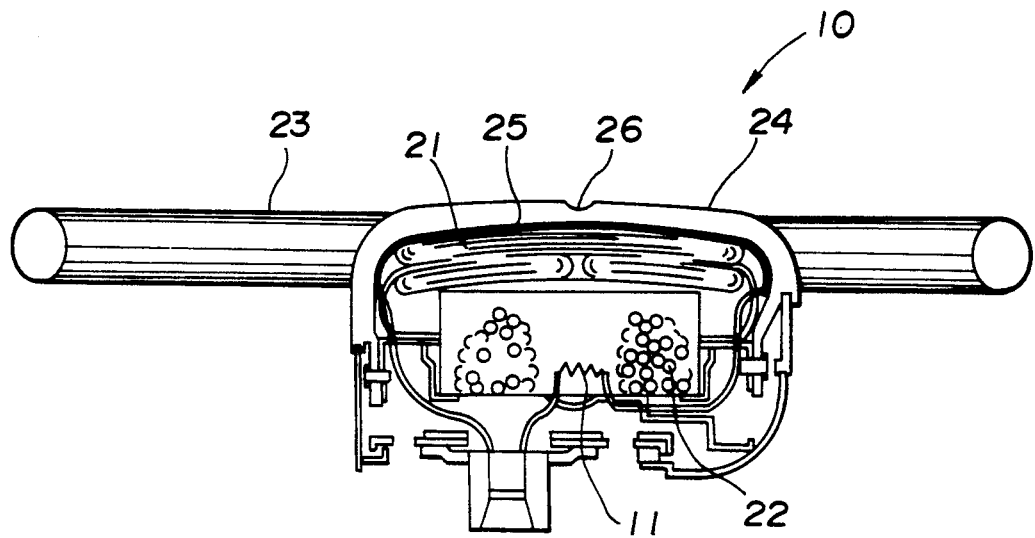
FIG. 2 is a cross-sectional view of a steering wheel having a part of an embodiment of the airbag restraint system in accordance with the present invention.
Figure 3:
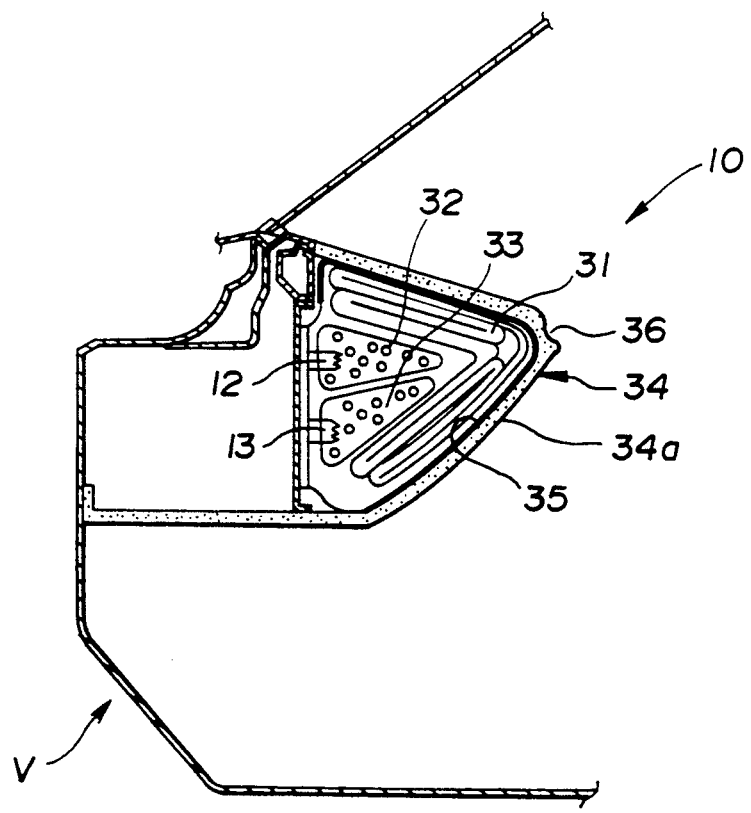
FIG. 3 is a cross-sectional view of a glove box having a part of the airbag restraint system of the embodiment of FIG. 2.
Figure 4:
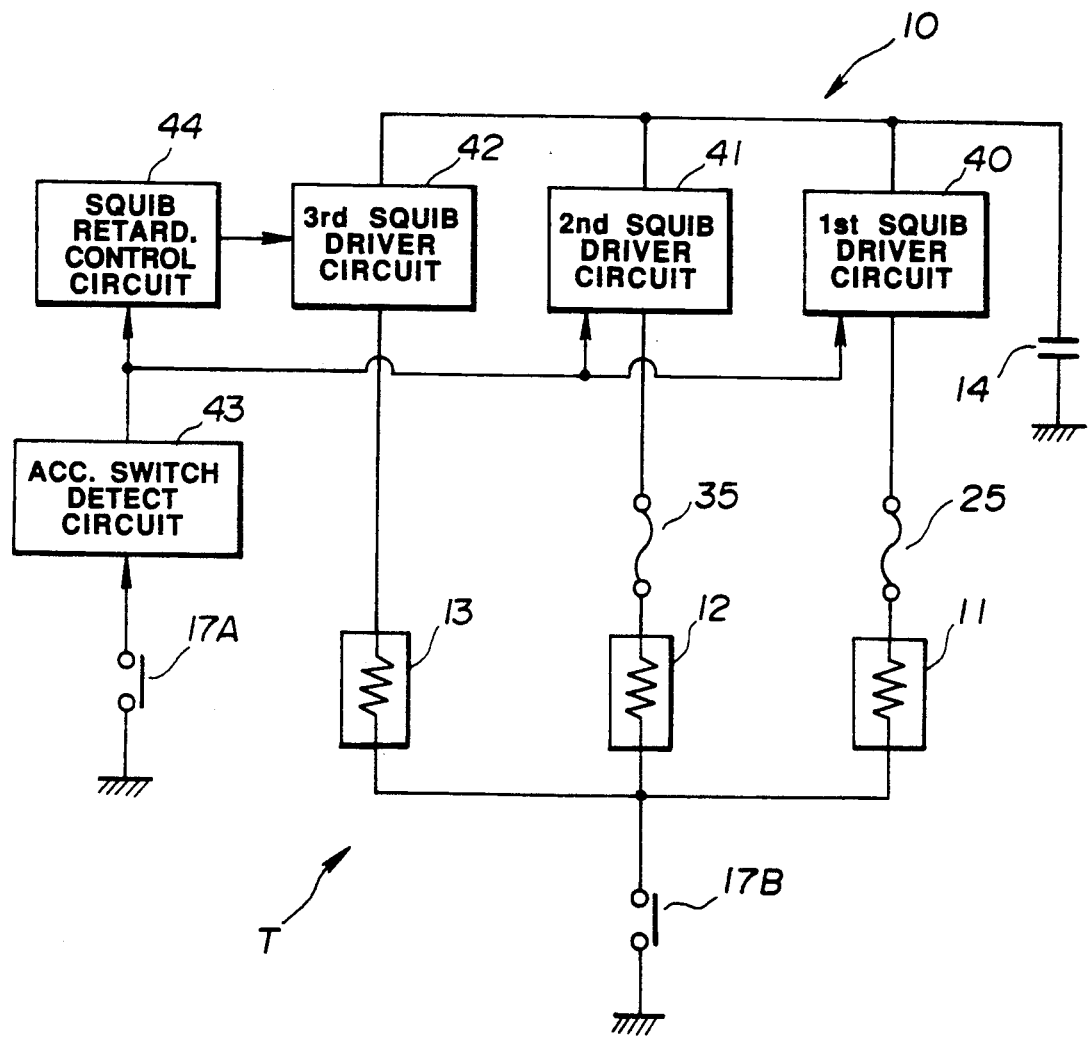
FIG. 4 is an electric circuit diagram of the airbag restraint system of FIGS. 1 and 2.

Referring now to FIGS. 2, 3 and 4 of the drawings, an embodiment of an airbag restraint system according to the present invention is illustrated by the reference numeral 10. The airbag restraint system 10 is mounted on an automotive vehicle V and comprised of first and second airbags 21, 31 which are respectively for a driver seated on a driver's seat (not shown) and a passenger seated on a front seat (not shown) beside the driver's seat.

As shown in FIG. 3, the first airbag 21 is stored in its folded state inside a steering wheel padding 24 located at the central part of a steering wheel 23. Additionally, a first inflator (or gas generator) 22 and a first squib 11 are disposed inside the padding 24. The squip 11 functions to ignite the inflator 22 upon being supplied with electric current, so that the inflator 22 generates high pressure gas to be filled into the first airbag 21. A band-shaped breakable conductor member 25 formed of a metallic foil is disposed between the padding 24 and the folded airbag 21. The breakable conductor member 25 is located on and across the upper surface of the folded airbag 21, so that the opposite end sections of the breakable conductor member 25 are positioned opposite to each other with respect to the folded airbag 21. The opposite end sections of the breakable conductor 25 are fixed to the steering wheel 23. Accordingly, the breakable metal 25 is broken as the airbag 21 inflates. The padding 24 is formed at its upper surface with a groove 26 for allowing the padding 24 to be easily broken thereby forming an opening through which the airbag 21 projects out and inflates.

As shown in FIG. 3, the second airbag 31 is stored in its folded state inside a so-called glove box or instrument panel 34 including a padding 34a. Additionally, second and third squibs 12, 13 and second and third inflators 32, 33 are disposed inside the glove box 34. The second squib 12 is adapted to ignite the second inflator 32 upon being supplied with electric current, so that the inflator 32 generates high pressure gas to be filled into the second air bag 31. Similarly, the third squib 13 is adapted to ignite the second inflator 33 upon being supplied with electric current, so that the inflator generates high pressure gas to be filled with the second airbag 31.

A band-shaped breakable conductor member 35 formed of a metallic foil is disposed between the padding 34a and the folded airbag 31 in a manner to be located on and across the upper surface of the folded airbag 31. Accordingly, the conductor member 35 is adapted to be broken when the airbag 31 starts to inflate. The padding 34a is formed at its outer surface with a groove 36 for allowing the padding 34a to be easily broken when the airbag 31 inflates and develops. It will be understood that the folded airbag 31 is disposed at a position to protect the passenger seated on the front seat beside the driver's seat, from coming into direct contact with a front windshield (not identified) and/or the instrument panel.

Figure 7:
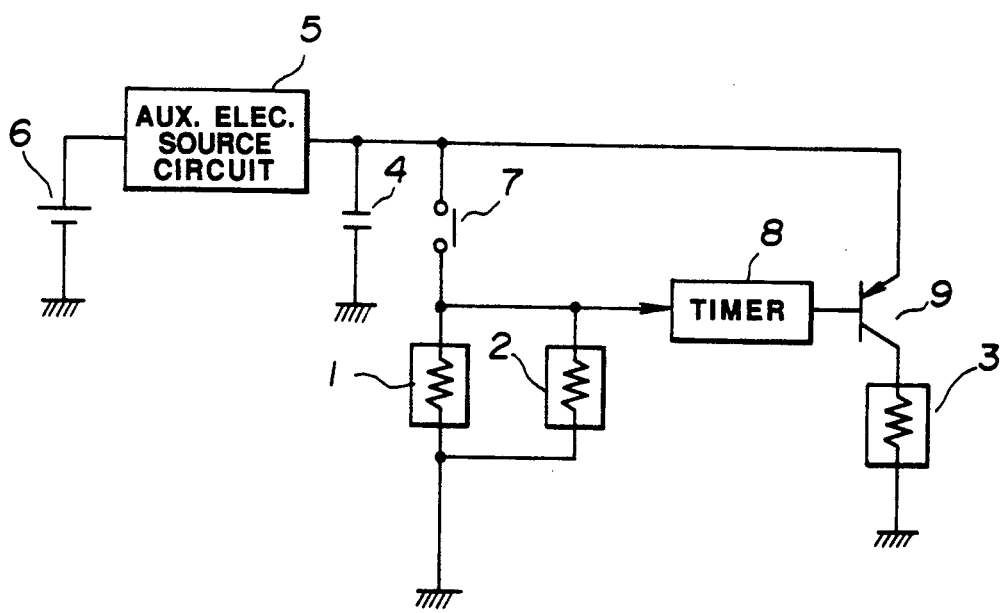
FIG. 7 is an electric circuit diagram of a conventional airbag restraint system.

FIG. 4 shows a triggering unit T for the triggering operation of the first, second and third squibs 11, 12, 13. The triggering unit T includes first, second and third squib driver circuits 40, 41, 42 which are electrically connected to a capacitor 14. The capacitor 14 is adapted to be charged from an electric source (not shown) such as a battery through an auxiliary electric source circuit (not shown) for raising the voltage of the electric source like the conventional arrangement shown in FIG. 7. The first squib driver circuit 40 is electrically connected through the breakable conductor member 25 with the first squib 11. The second squib driver circuit 41 is electrically connected through the breakable conductor member 35 with the second squib 12. A first acceleration (deceleration) switch 17A is provided to be turned ON when an acceleration (deceleration) sensor (not shown) detects a deceleration exceeding a predetermined level. The first acceleration switch 17A is electrically connected to an acceleration switch detecting circuit 43 which is in turn electrically connected with the first and second squib driver circuits 40, 41 and to a squib retardation control circuit 44. The acceleration switch detecting circuit 43 is adapted to feed a starting signal to the first and second squib driver circuits 40, 41 and to a squib retardation control circuit 44 in response to the turning-ON operation of the first acceleration switch 17A. The starting signal functions to operate the driver squib circuits 41, 42, so that the squib driver circuits 41, 42 cause electric current from the capacitor 14 to be fed respectively to the first and second squibs 11, 12. The squib retardation control circuit 44 is elecrically connected with the third squib driver circuit 42 and adapted to feed a starting signal to the squib driver circuit 42 upon lapse of a predetermined time after receiving the starting signal from the acceleration switch detecting circuit 43. The starting signal from the squib retardation control circuit 44 functions to operate the third squib driver circuit 42, so that the squib driver circuit 42 causes electric current from the capacitor 14 to be fed to the third squib 13. A second acceleration (deceleration) switch 17B is electrically connected with the first, second and third squibs 11, 12, 13 and adapted to be turned ON when the acceleration sensor detects the deceleration exceeding the predetermined level.

The manner of operation of the airbag restraint system of this embodiment will be discussed.

When the automotive vehicle undergoes a deceleration exceeding the predetermined level, the acceleration switch 17A is turned ON, which is detected by the acceleration switch detecting circuit 43. Accordingly, the acceleration switch detecting circuit 43 outputs the starting signal to the first and second squib driver circuits 40, 41 and to the squib retardation control circuit 44. In response to this starting signal, the first and second squib driver circuits 40, 41 immediately start to operate thereby to allow the charged voltage in the capacitor 14 to be fed to the squibs 11, 12 through the breakable conductor members 25, 35, respectively. At this time, the second acceleration switch 17B is also turned ON thereby allowing electric current to pass through the first, second and third squibs 11, 12, 13. Consequently, the heaters of the first, second and third squibs 11, 12, 13 generate heat to ignite the first and second inflators 22, 32, so that high pressure nitrogen gas is generated thereby to inflate and develop the first airbag 21 for the driver and the second airbag 31 for the passenger seated beside the driver. Such heat generation of each squib 11, 12, 13 is referred hereinafter to as "activation". The airbags 21, 31 break the steering wheel padding 24 at the groove 26 and the glove box padding 34 at the groove 26, respectively, and then inflate and develop in front of the driver's seat and the front seat beside the driver's seat, respectively. At this time, the first and second conductor members 11, 12 bleak thereby interrupting the flow of electric current to the first and second squibs 11, 12.

Upon lapse of the predtermined time after receiving the starting signal from the acceleration switch detecting circuit 43, the squib retardation control circuit 44 outputs the starting signal thereby to operate the third squib driver circuit 42. Upon starting of operation of the third squib driver circuit 42, the charged voltage of the capacitor 14 is fed to the third squib 3 thereby igniting the third inflator 33. It is to be noted that at this time, the flow of electric current to the first and second squibs 11, 12 has been already interrupted, and therefore the charged voltage of the capacitor 14 is fed only to the third squib 13. The ignited third inflator 33 generates high pressure nitrogen gas to be supplied to the second airbag 31 which has been already inflated to some extent under the gas pressure from the second inflator 32, thereby completely inflating and developing the second airbag 31 in front of the front seat beside the driver's seat. Thus, the inflation operation of the second airbag 31 is carried out separately at two stages thereby softening the shock against the passenger seated on the front seat beside the driver's seat.

As appreciated from the above, according to this embodiment, under breakage of the conductor member disposed on the surface of the folded airbag owing to the inflation of the airbag, electric power supply to the previously activated squib group is interrupted, and therefore unnecessary electric power consumption cannot be made even if the resistance value is lowered in the squibs after their activation. Accordingly, the capacity of the capacitor 14 can be minimized as compared with that in the conventional arrangement shown in FIG. 7.

Figure 5:
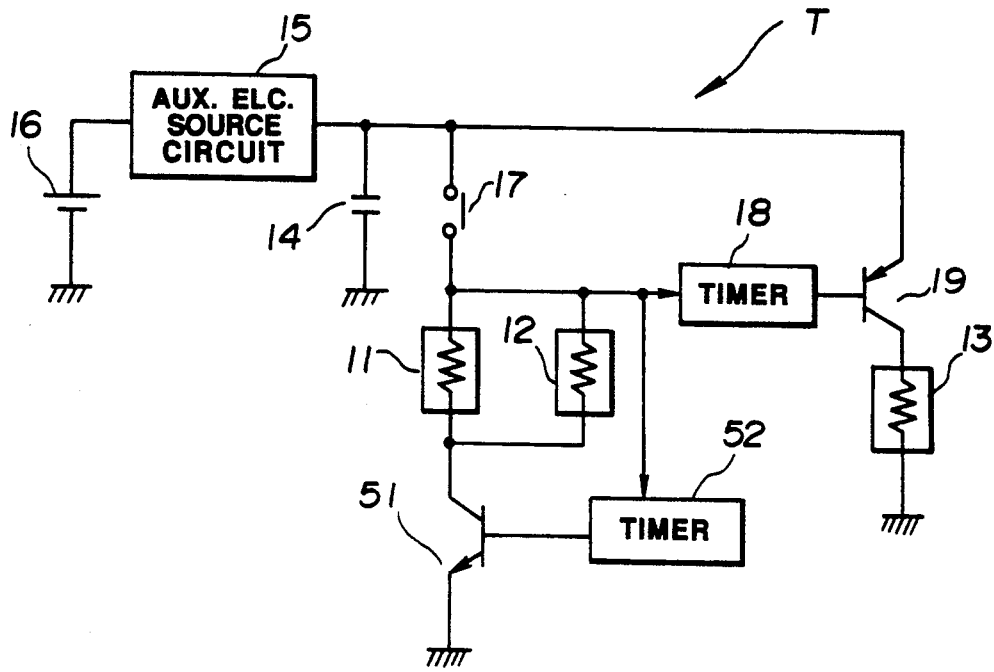
FIG. 5 is an electric circuit diagram of another embodiment of an airbag restraint system in accordance with the present invention.

FIG. 5 illustrates a triggering unit T of another embodiment of the airbag restraint system 10 of the present invention similar to the embodiment of FIGS. 2, 3 and 4. The triggering unit T of this embodiment includes an acceleration (deceleration) switch 17 which is turned ON when the acceleration sensor detects the deceleration exceeding the predetermined level. The acceleration swith 17 is electrically connected to the capacitor 14 which is charged from the battery 16 through the auxiliary electric source circuit 15 for raising the voltage of the battery 16. The capacitor 14 is electrically connected with the first and second squibs 11, 12 and to a timer 18. The timer 18 is electrically connected through a transistor 19 with the third squib 13. The timer 18 is adapted to start clocking at the time the acceleration switch 17 is turned ON, and to cause the transistor 19 to be turned ON upon lapse of a predetermined time after the turning-ON of the acceleration switch 17, thereby activating the third squib 13 to ignite the third inflator 33.

In this embodiment, a transistor 51 for switching is electrically connected to the first and second squibs 11, 12 and grounded. The transistor 51 is adapted to cause the first and second squibs 11, 12 to be turned ON or OFF. The transistor 51 is electrically connected with a timer 52 which is in turn connected to the acceleration switch 17. The timer 52 is adapted to cause the transistor 51 to be turned ON by a predetermined time after the turning-ON of the acceleration switch 17.

Figure 6:
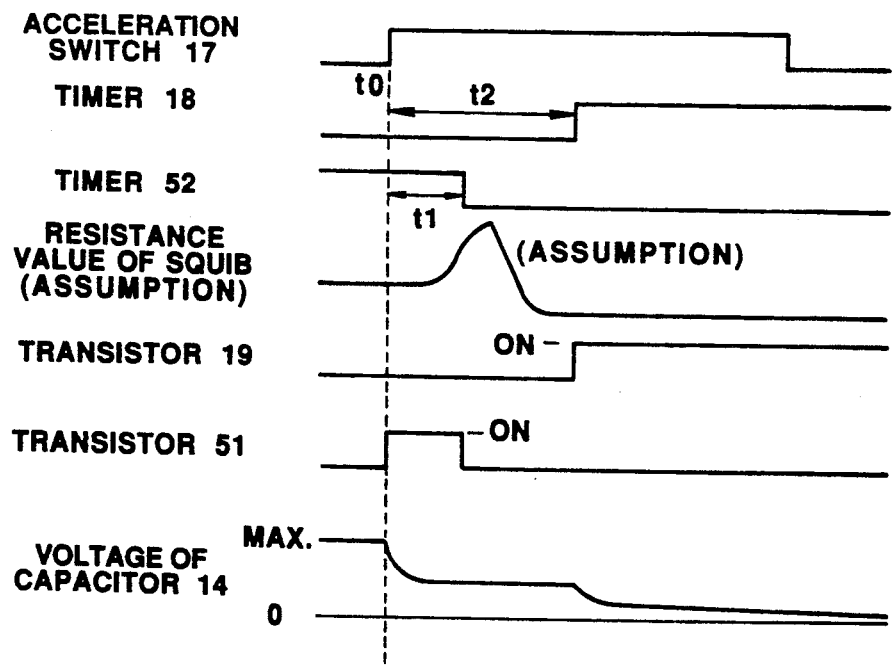
FIG. 6 is a time chart showing voltage changes in a variety of parts in the circuit diagram of FIG. 5.

The operation of the embodiment of the airbag restraint system including the triggering unit T of FIG. 5 will be discussed with reference to FIG. 6 which shows variations in voltage at a variety of parts of the triggering unit T.

When the deceleration exceeding the predetermined level is applied at a time t0 to the vehicle causing the acceleration switch 17 to be turned ON, the charged voltage of the capacitor 14 is fed to the first and second squibs 11, 12, accompanied with the starting of the timer 18 and the timer 52 so that the timers 18, 52 start their clocking. The starting of the timer 18 causes the transistor 51 to be turned ON, thus allowing electric current to pass through the first and second squibs 11, 12. Accordingly, the first and second inflators 22, 32 shown respectively in FIGS. 2 and 3 are ignited to generate high pressure nitrogen gas thereby to inflate and develop the first and second airbags 21, 31.

Upon lapse of a time t1, the timer 51 is turned OFF to stop clocking and therefore the transistor 51 is turned OFF thus to interrupt the flow of electric current through the first and second squibs 11, 12. Upon lapse of a time t2, the timer 18 is turned ON to start its clocking and to cause the transistor 19 to be turned ON so that the charged voltage of the capacitor 17 is fed to the third squib 13. As a result, the third inflator 33 shown in FIG. 3 is ignited to generate high pressure nitrogen gas to be filled into the second airbag 31 which has been already inflated to some extent under gas pressure from the second inflator 32. Thus, the second airbag 31 for the passenger on the front seat beside the driver's seat is compteltely inflated and developed. The time t1 of the timer 52 is set to have a time period within which ignition of the first and second inflators 22, 32 are sufficiently accomplished from the time t0. The time t2 of the timer 18 is set to have a time period within which the flow of electric current through the first and second squibs 11, 12 is interrupted under the effect of the transistor 51, from the time t0.

Thus, according to the embodiment of FIG. 5, the electric current supply to the early activated squibs is interrupted after the predetermined time under the effect of the timer and the transistor. Thereafter, the remaining squib is supplied with electric current. Therefore, for example, even if the resistance value of the squib 11 is lowered as indicated as an assumption in FIG. 6 after ignition of the first inflator 22, an unnecessary electric power consumption can be prevented, so that electric current is supplied only to the late activated squib like in the embodiment of FIGS. 2 to 4.

While the airbag restraint systems have been shown and described as having two airbags it will be understood that the principle of the present invention may be applicable to other airbag restraint systems having three or more airbags.

What is claimed is:

1. An airbag restraint system for a motor vehicle, comprising:
   first and second airbags;
   first inflating means for inflating said first airbag;
   second inflating means for inflating said second airbag;
   third inflating means for inflating said second airbag;
   first driving means for driving said first inflating means, said first driving means being operated upon when supplied with electric current;

second driving means for driving said second inflating means, said second driving means being operated upon when supplied with electric current;

third driving means for driving said third inflating means;

means for operating said first and second driving means when a deceleration exceeding a predetermined level is applied to the vehicle;

retardation means for operating said third driving means upon lapse of a predetermined time after a timing at which said first and second driving means are operated; and interrupting means for interrupting supply of electric current to said first and second driving means after said first and second inflating means starts to be driven.

2. An airbag restraint system as claimed in claim 1, wherein said interrupting means includes first breakable conductor means which is broken when said first airbag inflates, interrupting supply of electric current to said first driving means, and second said second airbag inflates, interrupting the supply of electric current to said second driving means.

3. An airbag restraint system as claimed in claim 1, wherein said first driving means includes a first squib, a first squib driver circuit for allowing the electric current to pass through said first squib when connected with said first squib, and a first breakable conductor member through which said first squib is electrically connected with said first squib driver circuit, said first breakable conductor member breaking an electrical connection between said first squib and said first squib driver circuit under a force of inflation of said first airbag.

4. An airbag restraint system as claimed in claim 3, wherein said second driving means includes a second squib, a second squib driver circuit for allowing the electric current to pass through said second squib when connected with said second squib, and a second breakable conductor member through which said second squib is electrically connected with said second squib driver circuit, said second breakable conductor member breaking an electrical connection between said second squib and said second squib driver circuit under a force of inflation of said second airbag.

5. An airbag restraint system as claimed in claim 4, wherein said first breakable conductor member is elongated and disposed on said first airbag in a folded state, and said second breakable conductor member is elongated and disposed on said second airbag in a folded state.

6. An airbag restraint system as claimed in claim 1, wherein said first driving means includes a first squib electrically connectable with an electric source, and said second driving means includes a second squib electrically connectable with the electric source.

7. An airbag restraint system as claimed in claim 6, wherein said interrupting means includes a transistor connected with said first and second squibs to control supply of electric current from said electric source to said first and second squibs, said transitor being adapted be able to be turned OFF to prevent electric current from said electric source from passing through said first and second squibs, and a timer adapted to cause said transistor to be turned OFF upon lapse of a predetermined time after said deceleration is applied to the vehicle.

* * * * *